(12) United States Patent
Becker-Weimann et al.

(10) Patent No.: US 9,518,187 B2
(45) Date of Patent: Dec. 13, 2016

(54) HIGH-GLOSS SURFACE BY MEANS OF HOT-COATING

(75) Inventors: Klaus Becker-Weimann, Karlsruhe (DE); Jens Fandrey, Pforzheim (DE)

(73) Assignee: KLEBCHEMIE M. G. BECKER GMBH & CO. KG, Weingarten/Baden (DE)

( * ) Notice: Subject to any disclaimer, the term of this patent is extended or adjusted under 35 U.S.C. 154(b) by 417 days.

(21) Appl. No.: 13/995,614

(22) PCT Filed: Dec. 19, 2011

(86) PCT No.: PCT/EP2011/073217
§ 371 (c)(1),
(2), (4) Date: Jul. 25, 2013

(87) PCT Pub. No.: WO2012/084805
PCT Pub. Date: Jun. 28, 2012

(65) Prior Publication Data
US 2013/0302625 A1 Nov. 14, 2013

(30) Foreign Application Priority Data
Dec. 20, 2010 (DE) .................. 10 2010 063 554

(51) Int. Cl.
| | | |
|---|---|---|
| B05D 1/30 | (2006.01) | |
| B05D 1/40 | (2006.01) | |
| B05D 5/06 | (2006.01) | |
| C09D 5/00 | (2006.01) | |
| B05D 7/00 | (2006.01) | |
| B05D 7/06 | (2006.01) | |

(52) U.S. Cl.
CPC .............. C09D 5/00 (2013.01); B05D 1/305 (2013.01); B05D 5/06 (2013.01); B05D 7/52 (2013.01); B05D 1/40 (2013.01); B05D 7/06 (2013.01); B05D 7/532 (2013.01); B05D 2503/00 (2013.01); B05D 2601/26 (2013.01); Y10T 428/31551 (2015.04)

(58) Field of Classification Search
CPC ....... B05D 1/305; B05D 1/40; B05D 2503/00; B05D 2601/26; B05D 5/06
See application file for complete search history.

(56) References Cited

U.S. PATENT DOCUMENTS

| | | | | |
|---|---|---|---|---|
| 5,575,706 A | * | 11/1996 | Tsai ...................... | B24B 57/02 156/345.12 |
| 2003/0074095 A1 | * | 4/2003 | Neubauer .............. | G01B 11/28 700/117 |
| 2004/0250906 A1 | * | 12/2004 | Becker-Weimann .... | B05D 7/08 144/332 |
| 2007/0098903 A1 | * | 5/2007 | Hurd ...................... | C08G 63/48 427/372.2 |
| 2008/0160216 A1 | * | 7/2008 | Fandrey .................. | B05D 7/08 427/595 |

FOREIGN PATENT DOCUMENTS

| | | |
|---|---|---|
| DE | 2 038 621 A1 | 2/1972 |
| DE | 10 2008 031 958 A1 | 1/2010 |
| DE | 10 2009 002 048 A1 | 10/2010 |
| JP | 2001-88105 A | 4/2001 |
| JP | 2007-229666 A | 9/2007 |
| JP | 2008-523986 A | 7/2008 |
| JP | 4948850 B2 | 6/2012 |
| WO | WO 2006/066954 A1 | 6/2006 |
| WO | WO 2007/026919 A1 | 3/2007 |
| WO | WO 2008/152137 A2 | 12/2008 |
| WO | WO 2008152137 A2 * | 12/2008 |
| WO | WO 2010/003960 A1 | 1/2010 |

OTHER PUBLICATIONS

International Search Report for PCT/EP2011/073217 mailed on Mar. 23, 2012.
Japanese Office Action, dated Sep. 1, 2015, for Japanese Application No. 2013-545255.
Japanese Office Action, dated May 31, 2016, for Japanese Application No. 2013-545255.

* cited by examiner

*Primary Examiner* — James M Mellott
(74) *Attorney, Agent, or Firm* — Birch, Stewart, Kolasch & Birch, LLP

(57) ABSTRACT

The present invention relates to a process for producing high-gloss surfaces on at least one portion of a substrate area, where the steps comprise (a) applying a layer made of a melt to at least one portion of the substrate area; (b) polishing of the applied layer of melt; (c) applying at least one lacquer layer to the polished layer of melt by means of a curtain-coating process; and (d) hardening the layer structure applied. The invention further relates to articles obtainable by this type of process.

14 Claims, No Drawings

HIGH-GLOSS SURFACE BY MEANS OF HOT-COATING

The present invention relates to a process for producing high-gloss surfaces and to articles with surfaces of this type.

There has recently been an increase in demand for high-gloss surfaces for element surfaces in the furniture- and wood-processing industry, and also in the production of floors.

This surface gloss is an optical perception which arises when a surface is viewed, an object then being perceived as glossy if most of the light incident on the surface is reflected directionally and only a small portion is reflected diffusely. High-quality high-gloss surfaces are perceived as having gloss similar to that of a glass surface. The gloss level can by way of example be determined by using appropriate gloss level measurement equipment to determine reflectance for a light beam incident at a defined angle. The term high gloss usually means a gloss level of from 80 to 100 at a test angle of 60°.

It has hitherto been disclosed that appropriate high-gloss surfaces can be produced by laminating high-gloss foils in the form of specific plastics sheets or plastics foils onto substrate sheets. Substrate sheets of a wide variety of forms and comprising a wide variety of materials can be coated by this method. However, the variety of decorative effects available on these plastics sheets and plastics foils is restricted, and the associated costs are high.

In a process that is likewise known, a finishing process is undertaken before the production of a substrate sheet is completed. Sheets of timber-based material, for example MDF or HDF, are coated with paper, preferably what are known as melamine papers, these being applied to the sheet with use of melamine resin and sealed, giving a directly coated substrate sheet. In order to achieve a desired high-gloss surface, transparent plastics foils are laminated onto substrate sheets prepared in this way. A disadvantage here is that the lamination material applied must be applied very homogeneously, with uniform layer thickness. The plastics foils that can be used moreover have a significant thickness in order to compensate possible unevenness of the substrate sheets or unevenness in application of the lamination material, and this increases costs.

The use of lacquers to produce a high-gloss surface on appropriately prepared, directly coated substrate sheets has hitherto been possible only at high cost, since lacquers exhibit poor adhesion properties on melamine layers. Although lacquers exhibit advantageous properties, for example rapid drying and high resistance to moisture and to cleaning compositions, they have therefore seldom been used hitherto in the production of high-gloss surfaces.

The low adhesion of lacquers often derives from their chemical and/or physical nature and from the nature of the surface to be coated therewith, and a known method here achieves increased adhesion through pretreatment of the surface. Adhesion promoter layers are used here; they improve the adhesion properties of the elements that are to be joined, and they can moreover compensate unevenness on the surfaces.

DE 10 2009 002 048 A1 discloses the use of a reactive polyurethane-based melt as thin adhesion promoter layer in conjunction with a lacquer layer that is then to be applied. However, there is no disclosure of the use of an adhesion promoter layer in conjunction with the production of a high-gloss surface.

Lacquer systems based on UV-curing lacquers are in general used in the production of furniture and of floors, and are applied to the appropriate parts by using rolls, or less frequently by using spray methods. The hardening procedure that follows uses UV light/UV lamps. The cost of machinery for lacquering is very high, as also is the space required. This is partially due to multilayer lacquer application—from three to four applications being usual in practice—since for reasons relating to viscosity and to thorough UV curing each lacquer application can only apply a very thin layer of about 10 to 20 µm. Furthermore, a number of intermediate lacquer polishing operations are mostly needed to achieve a surface having the smoothness required for high-gloss applications.

In particular, it is possible to achieve highly abrasion-resistant high-gloss surfaces, for example with abrasion resistance in the abrasion class>AC5, by adding abrasive materials in the lacquer systems used, an example being aluminum oxide particles or ceramic particles. When corundum-containing lacquer systems of this type are used, it is difficult to carry out intermediate polishing operations, and is not therefore possible to achieve surfaces with appropriately high gloss.

It is therefore expensive to combine high abrasion resistance, required by way of example for the floor sector or for a worktop, and the desire for a highly polished, high-gloss surface.

It is therefore an object of the present invention to provide a more efficient process for producing high-gloss surfaces, avoiding the abovementioned disadvantages.

The object is achieved via a process for producing high-gloss surfaces on at least one portion of a substrate area, where the steps comprise:

a) applying a layer made of a melt to at least one portion of the substrate area;
b) polishing of the applied layer of melt;
c) applying at least one lacquer layer to the polished layer of melt by means of a curtain-coating process;
d) hardening the layer structure applied.

The object is further achieved via an article with a high-gloss surface on at least one portion of a substrate area, obtainable by a process of the invention.

Surprisingly, it has been found that the use of a melt, in particular a reactive polyurethane-based melt on a substrate area, in particular a melamine-paper-coated timber particleboard or melamine-paper-coated MDF/HDF, provides a homogeneous and smooth surface which moreover improves the conditions for a lacquer layer to be applied in a subsequent step and thus permits production of a high-gloss surface of high quality.

In particular, a high-gloss surface of this type can be achieved even when the melamine surface has a certain texture and roughness depth, as is by way of example usually the case with commercially available sheet materials provided with a standard surface, these often having a structure, e.g. a mini-pearl structure. Accordingly, a melamine-laminated sheet material does not have to be prepared in the manner that is necessary with some lacquering processes.

The melt can be based on polyolefins, ethylvinyl acetates (EVAs), polyamides, or polyurethanes. It is preferable that the melt involves a reactive melt, in particular based on a polyurethane.

The preferred reactive polyurethane-based melt preferably involves a commercially available reactive polyurethane-based melt which preferably reacts and hardens by virtue of the moisture present in the atmosphere. It is preferable that said reactive melt is one that is now used for the purposes of "hotcoating" technology for the finishing of surfaces, being free from water and from solvent. A feature of these reactive polyurethane-based melts is not only simple application but also resistance to water vapor, moisture, and chemicals, and to mechanical stress. These reactive melts have a high level of adhesion-promoter properties, and only thin layers are therefore needed. In this context it is in particular surprising that an applied layer of reactive melt can harden although, for example, a lacquer layer separates this from the atmosphere and the moisture present therein which causes crosslinking and thus hardening.

Another surprising factor is that melts comprising highly abrasion-resistant, abrasive materials can also be used here. Melts of this type can be processed similarly, giving high layer thicknesses, for example in a range from 60 to 100 μm. Surprisingly, a high-gloss surface is achieved without a requirement for intermediate polishing steps. In particular, it is possible to produce highly abrasion-resistant high-gloss surfaces which by way of example have abrasion resistance in the abrasion class>AC5 in accordance with DIN EN 13329. Suitable abrasive materials are by way of example aluminum oxide particles or ceramic particles. A corundum-containing melt is preferred.

Suitable substrate areas are element surfaces, for example for laminate floors, for floorboards, or for parquet floors, for panels or veneers, or for furniture or items of furniture. The substrate areas can be composed of wood or of wood-like material, for example of a veneer or fiberboard, where these can previously be covered with paper, with plastic, or with other materials.

The melt can be applied by a roll method or spray method, or by means of a nozzle or slot die, to the area requiring coating, in particular to a timber particleboard provided with a melamine layer or to MDF/HDF provided with a melamine layer. It is preferable that the melt is applied by means of a roll apparatus to an appropriate surface. For this purpose, the substrate areas, e.g. in the form of substrate sheets, are transported by means of a transport apparatus in a particular transport direction and with a transport velocity past the roll apparatus, where melt is applied by means of at least one metering roll and one applicator roll, which rotates with a velocity in the range from 5 to 60 m/min, preferably from 10 to 25 m/min. The layer of melt applied is then by way of example polished by means of a downstream polishing roll which rotates in opposition to the applicator roll with a velocity in the range from 1 to 30 m/min, preferably from 1 to 6 m/min. It has proven advantageous to carry out application with exclusion of air and, respectively, isolation from moisture present in air.

The thickness of the layer of melt is preferably in the range from 5 to 200 μm, with preference from 10 to 60 μm.

The melt is usually applied at a temperature of at least 100° C., for example from 100° C. to 150° C., preferably from 120° C. to 150° C. By way of example, a correspondingly temperature-controlled applicator roll is used, and the temperature of the polishing roll here, which can likewise be a heatable roll, can differ from that of the applicator roll.

A layer of a high-gloss lacquer is then applied, preferably before complete hardening of the layer of melt, to the layer of melt that has been applied and polished, and a significant time saving is thus achieved. The layer of melt applied provides a surface on which the high-gloss lacquer to be applied exhibits good flow properties and homogeneous distribution.

In the step that now follows, the high-gloss lacquer is applied to the substrate area thus prepared, and it is preferable in the invention here to use what is known as a wet-on-wet method. It is preferable to use a pourable UV-curing high-gloss lacquer, an electron-beam-curing lacquer, a ceramic lacquer, and/or an aqueous lacquer, applied by means of the known curtain-coating process. The substrate area prepared by means of preceding steps is passed here through a lacquer curtain composed of liquid lacquer, whereupon lacquer is applied to give a coating in the range from 100 to 160 g per square meter.

After the smoothing of the layer of melt (step b)) and before the application of the high-gloss lacquer by the curtain-coating process (step c)), at least one first lacquer layer can optionally be applied before at least one further layer follows in step (c). This can involve any desired lacquer which advantageously hardens rapidly, to permit quick further processing. Suitable lacquers used can by way of example be clear, white, or colored lacquer, for example in the form of nitrocellulose lacquers, electron-beam-curing lacquer, ceramic lacquer, aqueous lacquers, or 2C PU lacquers. However, it is preferable to use UV-curing lacquers. This type of lacquer-application process can apply a layer of thickness about 10 to 20 μm and it is therefore possible to achieve thorough UV curing within a reasonable time. The optional lacquering step can be achieved by means of conventional processes, for example application by a roll method, or by the spray process, or ink jet. This optional step provides a very smooth substrate area on which a further lacquer layer can be applied in the following step, in order by way of example to achieve a high-gloss surface of the highest quality.

After application of the high-gloss lacquer, the layers applied are hardened, and it is preferable here to observe a waiting time in particular of some minutes, for example at least 1 minute, in order that the at least one lacquer layer becomes homogeneously distributed on the surface.

The at least one lacquer layer applied, preferably a UV-curing layer, is hardened via irradiation with the aid of commonly used apparatuses, for example UV lamps. In order to produce a high-gloss surface of high quality it is important that during the hardening procedure the surface covered remains as far as possible free from undesired particles. To this end, a superatmospheric pressure can be generated in the irradiation apparatus, preferably provided in the form of a tunnel, so that ingress of foreign particles, e.g. dust particles, is avoided.

What is claimed is:

1. A process for producing high-gloss surfaces on at least one portion of a substrate area, wherein the substrate area is composed of wood or wood-like material and the substrate area is covered with melamine paper, where the steps comprise:
    a) applying a layer made of a reactive melt to at least one portion of the substrate area covered with melamine paper;
    b) polishing the applied layer of melt;
    c) applying at least one lacquer layer to the polished layer of melt by means of a curtain-coating process; and
    d) hardening the layer structure applied.

2. The process as claimed in claim 1, wherein the reactive melt is based on a polyurethane.

3. The process as claimed in claim 1, wherein the melt is applied in step a) by means of a roll apparatus comprising at least one metering roll and an applicator roll rotating in a direction of rotation.

4. The process as claimed in claim 3, wherein the applicator roll rotates with a velocity in the range from 5 to 60 m/min.

5. The process as claimed in claim 4, wherein the applicator roll rotates with a velocity in the range from 10 to 25 m/min.

6. The process as claimed in claim 3, wherein the melt applied in step a) is polished by a polishing roll rotating in opposition to the direction of rotation of the applicator roll.

7. The process as claimed in claim 6, wherein the polishing roll rotates with a velocity in the range from 1 to 30 m/min.

8. The process as claimed in claim 7, wherein the polishing roll rotates with a velocity in the range from 1 to 6 m/min.

9. The process as claimed in claim 1, wherein the melt applied in step a) comprises an abrasive material.

10. The process as claimed in claim 1, wherein the lacquer layer to be applied in step c) comprises a pourable UV-curing high-gloss lacquer.

11. The process as claimed in claim 1, wherein prior to step c) at least one first lacquer layer comprising a UV-curing lacquer is applied with the aid of a roll, by way of spray equipment, or by means of ink jet.

12. The process as claimed in claim 1, wherein step c) uses a wet-on-wet method.

13. The process as claimed in claim 1, wherein prior to step d) a waiting time is observed for hardening.

14. The process as claimed in claim 1, wherein the substrate area covered with melamine paper is an element surface of a laminate element, of a parquet element, or of a floorboard element, of a panel, or of a veneer, furniture, or an item of furniture.

* * * * *